US008906441B2

(12) United States Patent
Rajesh et al.

(10) Patent No.: US 8,906,441 B2
(45) Date of Patent: Dec. 9, 2014

(54) PEANUT SPREAD

(75) Inventors: Anila Lily Ann Rajesh, Englewood Cliffs, NJ (US); Earl Carroll Eichelberger, Englewood Cliffs, NJ (US); Timothy Edgar Meier, Englewood Cliffs, NJ (US); Domingo Maurice Bugg, Jr., Englewood Cliffs, NJ (US); Ella Larson Kinzie, Evanston, IL (US)

(73) Assignee: Hormel Foods Corporation, Austin, MN (US)

( * ) Notice: Subject to any disclaimer, the term of this patent is extended or adjusted under 35 U.S.C. 154(b) by 53 days.

(21) Appl. No.: 13/615,887

(22) Filed: Sep. 14, 2012

(65) Prior Publication Data

US 2013/0078359 A1    Mar. 28, 2013

Related U.S. Application Data

(60) Provisional application No. 61/537,897, filed on Sep. 22, 2011.

(51) Int. Cl.
    A23D 9/00    (2006.01)
    A23L 1/38    (2006.01)
    A23G 1/00    (2006.01)
    A23G 1/50    (2006.01)

(52) U.S. Cl.
    CPC ... *A23D 9/00* (2013.01); *A23L 1/38* (2013.01); *A23G 1/50* (2013.01)
    USPC ............................ 426/607; 426/633; 426/631

(58) Field of Classification Search
    USPC .......................................... 426/607, 633, 631
    See application file for complete search history.

(56) References Cited

U.S. PATENT DOCUMENTS

| | | | |
|---|---|---|---|
| 3,882,254 A | 5/1975 | Gooding | |
| 3,901,977 A | 8/1975 | Rebane | |
| 3,978,246 A | 8/1976 | Chozianin et al. | |
| 4,364,967 A | 12/1982 | Black | |
| 4,423,085 A | 12/1983 | Chen et al. | |
| 4,762,725 A | 8/1988 | Player et al. | |
| 4,923,708 A | 5/1990 | Given, Jr. | |
| 4,996,074 A | 2/1991 | Seiden et al. | |
| 5,023,102 A | 6/1991 | Given, Jr. | |
| 5,079,027 A | 1/1992 | Wong et al. | |
| 5,230,919 A | 7/1993 | Walling et al. | |
| 5,532,022 A | 7/1996 | Millet et al. | |
| 5,714,193 A | 2/1998 | Fix et al. | |
| 5,743,639 A | 4/1998 | Puerner et al. | |
| 5,885,646 A | 3/1999 | Wong et al. | |
| 5,942,275 A * | 8/1999 | Wong et al. .................. 426/631 |
| 6,063,430 A | 5/2000 | Wong | |
| 6,203,841 B1 | 3/2001 | Lynch et al. | |
| 6,623,783 B1 | 9/2003 | Wong et al. | |
| 6,703,064 B1 | 3/2004 | Milley | |
| 6,756,070 B1 | 6/2004 | Milley | |
| 6,773,744 B1 | 8/2004 | Ward et al. | |
| 6,808,737 B2 * | 10/2004 | Ullanoormadam ........... 426/603 |
| 6,982,101 B2 | 1/2006 | Liu et al. | |
| 7,344,747 B2 | 3/2008 | Perlman | |
| 7,998,521 B2 * | 8/2011 | Huizinga et al. .............. 426/607 |
| 2003/0104075 A1 | 6/2003 | Chevaux et al. | |
| 2003/0211223 A1 | 11/2003 | Eichelberger et al. | |
| 2003/0211224 A1 | 11/2003 | Eichelberger et al. | |
| 2004/0081744 A1 | 4/2004 | Liu et al. | |
| 2004/0096567 A1 | 5/2004 | Thaler et al. | |
| 2005/0142276 A1 | 6/2005 | Slesinski et al. | |
| 2005/0220971 A1 | 10/2005 | Coburn | |
| 2006/0045938 A1 | 3/2006 | Slesinski et al. | |
| 2008/0193605 A1 | 8/2008 | Gonzalez et al. | |
| 2008/0193624 A1 | 8/2008 | Shulman et al. | |
| 2008/0311273 A1 | 12/2008 | Ringhouse et al. | |
| 2009/0081352 A1 | 3/2009 | Hatano et al. | |
| 2011/0151101 A1 | 6/2011 | Iwamoto et al. | |

FOREIGN PATENT DOCUMENTS

| | | |
|---|---|---|
| CA | 2264859 C | 8/2005 |
| CA | 2332280 C | 9/2005 |
| CA | 2307495 C | 7/2008 |
| CA | 2734412 A1 | 3/2010 |
| CA | 2322860 C | 10/2010 |
| WO | 2008150169 A1 | 12/2008 |
| WO | 2011011271 A1 | 1/2011 |

OTHER PUBLICATIONS

Berger, K. G. et al. 2005. JAOCS 82(11)775.*
Deffense, E., "Fractionation to produce novel oleins and stearins for the food and shortening market", AgroFOOD industry hi-tech May 2008 vol. 19 No. 3 pp. 67-68.

(Continued)

*Primary Examiner* — Carolyn Paden
(74) *Attorney, Agent, or Firm* — IPLM Group, P.A.

(57) ABSTRACT

Nut spreads having a stabilizer which is a blend of certain palm oil fraction stabilizers with certain cocoa butters and/or cocoa butter equivalents and/or replacers and/or substitutes and/or extenders (with similar fatty acid profile to cocoa butter). When these fats are used in combination, particularly at ratios preferred herein, they impart a smooth creamy texture to the final nut butter or nut butter based products and more importantly provide enhanced stability during storage, preventing oil separation in the final product during prolonged storage. The texture and spreadability of the final nut spread based product achieved by using this blend is also superior to the texture and spreadability obtained by using conventional palm oil alone. Preferably the cocoa butters, equivalents, replacers and substitutes are not hydrogenated.

21 Claims, No Drawings

(56) References Cited

OTHER PUBLICATIONS

Gee, P., "Analytical characteristics of crude and refined palm oil and fractions", Eur. J. Lipid Sci. Technol., 2007, 109, 373-379.

Hamm, W., "Fractionation Technology", http://www.britanniafood.com/english/invite_03.htm, Nov. 13, 2005, 1-8.

Kellens, M. et al., "Palm oil fractionation", Eur. J. Lipid Sci. Technol, 2007, 109, 336-349.

Lin, S., "Palm Oil", Vegetable Oils in Food Technology: Composition, Properties and Uses, 2nd Ed., 2011, 25-58.

Stew, W. et al., "Physical properties of lipase-catalyzed interesterification of palm stearin with canola oil blends", Eur. J. Lipid Sci. Technol., 2007, 109, 97-106.

Nutella Frequently Asked Questions (FAQS), http://www.nutellausa.com/faqs.htm, 1 page, retrieved Sep. 1, 2011.

Peanut Butter & Co., Dark Chocolate Dreams, http://www.ilovepeanutbutter.com/darkchocolatedreams.html, 1 page, retrieved Sep. 1, 2011.

Peanut Butter & Co., Dark Chocolate Dreams, Nutrition Facts, http://ilovepeanutbutter.com/media/nutritional/17010006_nutr.gif, 1 page, retrieved Sep. 1, 2011.

Ciranda product brochure, "Palmfruit Organic Refined Palm Stearin 52 degrees C"., revised Feb. 21, 2008, 1 page.

Ciranda brochure, "Palmfruit Organic Palm Fruit Oils", undated, 2 pages.

"Skippy® Brand Peanut Butter/Skippy® Natural Creamy" Product Information, http://peanutbutter.com/Products/skippy_nat_c.html, 1 page, retrieved Jul. 3, 2013.

Nutrition Facts, http://www.peanutbutter.com/Images/Products/Skippy/natc_nut.png, 1 page, retrieved Jul. 3, 2013.

"Skippy squeezes into new packs", Packaging World, Mar. 31, 2003, http://www.packworld.com/package-feature/safety/skippy-squeezes-new-packs; Retrieved Jul. 3, 2013.

Photographs of SKIPPY® SQUEEZE STIX packaging, known of prior to Sep. 14, 2012, 6 pages.

Revel A Product Information, http://northamerica.croklaan.com, 1 page, retrieved Jul. 3, 2013.

IOI Group, Loders Croklaan, "Revel A Structuring Fat" Product Data Sheet, Rev. date Mar. 2011, 1 page.

IOI Group, Loders Croklaan, "Revel A" Nutritional Information, Mar. 17, 2011, 1 page.

IOI Group, Loders Croklaan, "Material Safety Data Sheet Products: Shortening, Fats, or Oils", Jan. 1, 2009, 2 pages.

Orthodox Union Letter of Certification, Loders Croklaan, Union of Orthodox Jewish Congregations of America, Aug. 25, 2010, p. 46.

* cited by examiner

PEANUT SPREAD

BACKGROUND OF THE INVENTION

Nut butters, such as peanut butter, are appreciated by consumers for many of their attributes, including nutritive value, convenience, texture and taste. One of the nutrition concerns of health professionals and consumers in recent years has been the presence in packaged foods of ingredients considered to be "unnatural," especially trans-fatty acids formed by partial hydrogenation of unsaturated oils. As a result, there have been efforts, with varying degrees of success, to develop nut butters and other products with ingredients considered to be more "natural," e.g., by using stabilizers which have not been hydrogenated.

While peanut butters and other peanut spreads have generally been considered to be organoleptically-pleasing foods, particularly given their generally favorable nutritive characteristics, efforts have been made to make these products even more palatable. For example, certain products have added chocolate or chocolate components. Not only does this make the product even more appetizing, but the consumer of such a product may benefit from ingestion of beneficial chocolate components such as polyphenols.

A problem which sometimes accompanies deviations from a "normal" peanut butter formulation is a tendency toward separation of the liquid (at room temperature) oil from the remainder of the product. Some "natural" peanut butters are known for the presence of a layer of oil separated from the balance of the product, requiring the consumer to mix the two in order to obtain a homogeneous spread. It is preferred by many not to have the oil separate and, therefore, to eliminate the chore of mixing together the liquid oil phase and the more solid phase.

Peanut and other nut spreads have received considerable attention in the patent literature, in the technical literature, and in the marketplace.

Gooding, U.S. Pat. No. 3,882,254 discloses a peanut butter having resistance to oil separation prepared from peanut butter and a non-hydrogenated hard fraction separated from palm oil. Gooding mentions that the hard fraction of palm oil contains a significant amount of polyunsaturated acids, as much as 3-5 times the amount usually present in butter fat and as much as the amount usually present in cocoa butter.

Player et al., U.S. Pat. No. 4,762,725 mentions palm stearine as a stabilizer for peanut butter. Durkee 27 partially hydrogenated palm oil stearine having a capillary melting point of 136° to 148° F. and an iodine value of 5 max is specifically mentioned.

Given, U.S. Pat. Nos. 4,923,708 and 5,023,102 are directed to a fat bloom inhibitor for chocolates. The inhibitor additives are said to be particularly suitable for inhibiting fat bloom of a confectioners coating where the center has a high fat content which can diffuse from the center to the coating as is common with peanut butter.

Seiden et al., U.S. Pat. No. 4,996,074 discloses stabilizers for peanut butter and other shortenings.

Walling et al., U.S. Pat. No. 5,230,919 is directed to a peanut butter. The preferred stabilizer is said to be a fully hydrogenated mid fraction of palm oil. Possible additives include chocolate chips or bits.

Eichelberger et al., US Patent Application Publication No. US2003/0211223 is directed to a squeezable nut butter which may be a peanut butter. Stabilizers of palm origin are mentioned. Stabilizers may be present at from 0.25-1.75% and may be high melting, e.g. 145° F.-155° F. Overall levels may be from 0.5-10%.

Eichelberger et al., US Patent Application Publication No. US2003/0211224 is directed to an edible product comprising a squeezable nut butter in combination with a further edible component. Examples of further edible components include chocolate. High melting vegetable oil stabilizers of palm oil origin at a level of 0.5-10% may be included. The stabilizer may have a melting point of 145° F.-155° F.

Slesinski et al., US Patent Application Publication No. US2005/0142276 is directed to a peanut or other nut spread with reduced levels of adjusted carbohydrates. A stabilizer may be included at 0.5-10% which is high melting (145° F.-155° F.), especially one of palm or similar vegetable oil origins. Chocolate may be included.

Perlman, U.S. Pat. No. 7,344,747 discloses a peanut butter in which omega-3 fatty acids are said to be stabilized against oxidation. The contemplated oxidation-stabilized oil is said to be a blend of omega-3 enriching oil with either a low linoleic, high oleic oil or a low linoleic high saturates selected from a group which includes cocoa butter, coconut oil, palm kernel oil and palm oil.

Slesinski, US Patent Application Publication No. US2006/0045938 is directed to a peanut cream which can be used to produce a snack or other food bar which includes at least two filling layers directly adjacent to each other. A chocolate coating may be present. Chocolate chips may be included. High melting vegetable oil stabilizers of palm, cottonseed and similar vegetable oil origins at a level of 0.5-10% may be used. The high melting stabilizers have a melting point of 145°-155° F. The stabilizer is said to tend to reduce liquid oil separation and to improve the viscosity of the product. The source for any fat used in the food bars is preferably vegetable fat such as, for example, cocoa butter, palm, palm kernel, soybean, safflower, cottonseed, coconut, rapeseed, canola, corn, peanut and sunflower oils, or mixtures thereof.

Gee "Analytical characteristics of crude and refined palm oil and fractions," Eur. J. Lipid. Sci. Technol. 109 (2007), 373-379, mentions that palm oil can be physically refined and fractionated into various fractions, ranging from very hard palm stearin with iodine values below 10 to palm superolein with iodine values as high as 72.

Peanut Butter and Company sells a product called Dark Chocolate Dreams which includes peanuts, evaporated cane juice, cocoa, cocoa butter, palm fruit oil, vanilla, lecithin (from sunflowers) and salt, (Accessed on the Internet Sep. 1, 2011).

Nutella® is advertised as a spread made from a combination of roasted hazelnuts, skim milk and a hint of cocoa. It lists palm oil as an ingredient (Accessed on the Internet Sep. 1, 2011).

Unilever has sold in the United States for more than a year a "natural" peanut butter containing a non-hydrogenated palm fraction stabilizer having an IV of 14.

Unilever sold in the United States a peanut butter product called squeeze sticks which included chocolate more than a year before the filing of the present application. The sticks included a hydrogenated, non-palm based, vegetable oil stabilizer.

Loders Croklaan of Channahon, Ill., has sold for more than one year in the United States Revel A. Revel A is currently described on its website (accessed Sep. 2, 2011) as a non hydrogenated, no trans structuring and stabilizing fat for peanut butter and a crystallizing aid in lauric fat based compound coatings. The website indicates that it has an iodine value of 16 max and a capillary melting point of 140° F. minimum. Typical usage rates for peanut butter are said to be 2%.

US Patent Application Publication No. US 2011 151101 mentions a palm kernel stearin having an IV of preferably less than 7.

WO 08/150169 mentions in Example 3 a stearin fraction of a palm stearin, having an IV of 12.

US Patent Application Publication No. US 2009/081352 discloses a solid fat derived from palm oil which has an iodine value of 0 to 21.

US Patent Application Publication No. 2008/193624 discloses human milk fat substitutes. Palm stearin IV 15 is mentioned.

US Patent Application Publication No. US 2004/096567 is directed to peanut butter with organic stabilizers. Palm stearin is mentioned as stabilizer.

U.S. Pat. No. 6,203,841 mentions palm stearin.

SUMMARY OF THE INVENTION

The invention is directed to the discovery of nut spreads having a stabilizer which is a blend of certain palm oil fraction stabilizers with certain cocoa butters or cocoa butter equivalents and/or replacers and/or extenders and/or substitutes (with similar fatty acid profile to cocoa butter). When these fats are used in combination, particularly at ratios preferred herein, they impart a smooth creamy texture to the final nut butter or nut butter based products and more importantly provide enhanced stability during storage, preventing oil separation in the final product during prolonged storage. The texture & spreadability of the final nut spread based product achieved by using this blend is also superior to the texture and spreadability obtained by using conventional palm oil alone. Preferably the cocoa butters, -equivalents, replacers and substitutes are not hydrogenated.

Particularly preferred are palm oil fractions having an iodine value of 20 or less, especially 16 or less, such as 14 or less. Lower levels of iodine values achievable are presently 10 or below. Likewise, cocoa butters and equivalents and replacements having iodine values of from 29 to 42, especially from 32 to 42, are preferred. The benefits of the invention are seen especially when the fat/oil content of the nut spread is 47 wt % or greater.

For a more complete description of the above and other features and advantages of the invention, reference should be made to the following description of the preferred embodiments.

DETAILED DESCRIPTION OF THE INVENTION

The nut spreads of this invention may, if so desired, fully comply with the FDA standard of identity for peanut butter applicable as of Jan. 1, 2003. This requires that the standardized product contain a minimum of 90 percent ground roasted peanuts, no artificial flavor, and no more than 10 percent of optional seasoning and stabilizing ingredients such as salt, nutritive sweeteners and hydrogenated vegetable oils and emulsifiers such as mono- and diglycerides. However, the presence of non-natural ingredients such as chemical emulsifiers and hydrogenated fats/oils, especially partially hydrogenated fats/oils, is preferably excluded in the present invention to make the product more "natural." The invention may also take the form of products other than Standard of Identity peanut butters, such as those known as peanut spreads, artificial peanut butter or by other names so long as they are spreadable. As used herein a "peanut spread" encompasses Standard of identity peanut butters as well as non-Standard of identity nut spreads. The percent by weight of peanuts can range from upward of 50 percent, from 50 to 90 percent for nonstandard spreads and from 90 to 95 percent and higher for standard peanut butters.

Nut spreads according to the invention include a stabilizer which is a non-hydrogenated, palm oil fraction, and a stabilizer which is a cocoa butter.

In one embodiment, non-hydrogenated, palm oil fraction stabilizers according to the invention will preferably comprise at least 50%, based on the weight of the palm oil based stabilizer, of a fat having an SFC of at least 94% at 10° C. and at least 85% at 35° C. and a melting point of 140° to 160° F.

In one embodiment, non-hydrogenated, palm oil fraction stabilizers according to the invention will preferably have an IV of 20 or less and melting point of 140° to 160° F. and a cocoa butter and/or a cocoa butter replacement and/or a cocoa butter equivalent and/or a cocoa butter substitute and/or a cocoa butter extender has an IV of from 29 to 42 and melting point of 88° to 97° F., at a weight ratio of 9:1-1:9.

Palm fraction stabilizers according to the invention will preferably have an iodine value of 16 or less, preferably 16 to 14, and a melting point of 140° F. to 160° F. The iodine value may be measured by the process according to ASTM D1541-97. Preferably the palm-based stabilizer has a saturated fat content of >85% and a melting point of 140° F. to 160° F. Iodine value is a well established measure of unsaturation in the fat and is inversely related to the degree of saturation in the fat. So, a lower iodine value means higher amount of saturated fatty acids in the fat.

In the present invention, the non-hydrogenated palm based stabilizer is combined with cocoa butter or a fat having a similar fatty acid profile such as a cocoa butter substitute, replacement or extender. So, for instance, a high melting hard fraction of palm oil with an IV value of less than 16, and a saturated fat content of 85% or higher and a melting point of 140° F. to 160° F. is advantageously used along with a cocoa butter of IV of 32 to 42 and melting point of 88° to 97° F. and saturated fat content of 60% or more to help form a continuous network within the peanut butter during the cooling process and thereby prevent oil separation on storage. This unique blend of fat stabilizers (cocoa butter plus non-hydrogenated palm based stabilizer) in addition to imparting superior stabilizing properties also imparts a superior mouth feel as the product melts more easily in the mouth than regular peanut butter made using hydrogenated fats or palm oil alone as stabilizer.

The palm based stabilizer may be included in the product at, for instance, from 1-4%, especially 2.5-3.5 wt %.

Generally, cocoa butter substitute will meet the following criteria:
Melting point–91° to 117° F.
Iodine Value . . . <37
SFC at 20° C. . . . 85 to 65 min
SFC at 25° C. . . . 53 min
SFC at 30° C. . . . 37-24 mm
SFC at 35° C. . . . 5 max Cocoa butter will often meet the above criteria as well.

In its preferred embodiment, this discovery relates to a blend of two fats with specified IV values and melting points which act synergistically to give a stable crystalline fat network in the peanut butter such that the final product has superior structural stability on transit and prolonged storage and at the same time gives a superior mouthfeel due to easier meltdown in the mouth (due to the sharp melting profile of cocoa butter). Preferred palm fraction stabilizers herein include "Revel A" sold by Loders Croklaan of Channahon, Ill., which has a IV value of 16 or less and a melting point range of 140° to 160° F.

The second stabilizer present in the products according to the invention is cocoa butter or another fat with a similar fatty acid profile. Cocoa butter is a fat obtained from the plant *Theobroma cacao*. Butters for use in the invention have iodine values from 29 to 42, especially from 32 to 42, and a melting point of 88° to 97° F. Cocoa butter equivalents, replacements, substitutes and extenders are well known in the art. These may also be used provided they have a similar fatty acid profile to cocoa butter. Examples of these include:

EXAMPLES

Products Sold by LODERS CROKLAAN

1. Freedom 905 coating fat (CBR/CBS TYPE)) is a no-trans, non-hydrogenated product composed of palm kernel and palm oil. Freedom 905 combines a steep melting profile with good heat stability. Additionally, Freedom 905 coating fat provides improved crystallization properties Mettler Dropping Point . . . 33-39° C./91-102° F.
Iodine Value . . . 10 max
SFC at 20° C. . . . 77-85
SFC at 30° C. . . . 24-32
SFC at 35° C. . . . 3 max 2. Freedom 540 coating fat (CBR/CBS TYPE) is a no-trans, non-hydrogenated product composed from palm oil.

Freedom 540 combines a steep melting profile with good heat stability to deliver a high quality finished coating as well as durability through the distribution. Additionally, Freedom 540 offers lower saturated fat content compared to palm kernel coatings, thus giving a very clean label from both the trans and saturated fat perspective.

Mettler Dropping Point . . . 41-47° C./106-117° F.
SFC at 20° C. . . . 72-80
SFC at 30° C. . . . 23-37
SFC at 40° C. . . . 10 max 3. Coberine 707 is a cocoa butter equivalent (CBE) (vegetable oil-palm shea) produced by fractional crystallization, hence fully natural.

Iodine Value . . . 33-37
SFC at 20° C. . . . 65 min
SFC at 25° C. . . . 53 min
SFC at 30° C. . . . 32 min
SFC at 35° C. . . . 5 max The palm fraction and cocoa butter (or replacement or equivalent or substitute) stabilizers are preferably used in the nut spreads of the invention within a weight ratio range of palm oil fraction to cocoa buffer for replacement/equivalent) of 9:1-1:9, especially from 4:1-1:. The invention is also directed to a stabilizer composition combining a palm oil fraction having an IV of 16 or less and a cocoa butter or equivalent or replacer having an IV of from 29 to 42, at a weight ratio of 4:1-1:4, especially from 2:1 to 1:1, most preferably from 1.5:1 to 1:1 or 1.25:1 to 1:1.

The cocoa butter and/or replacement and/or equivalent and/or substitute may be added in the form of a chocolate. Types of chocolate which may be used include, dark, milk, and white, whether sweetened, semi-sweet or unsweetened. Of course, chocolate generally includes, in addition to cocoa butter, cocoa solids as well. Chocolate generally includes from 10 to 40 wt % cocoa butter and/or equivalents and/or replacements and/or substitutes. Although chocolates tend to include soy lecithin, for the present invention it is preferred that this be omitted to improve the "naturalness" of the product. Suitable chocolate without soy lecithin is available from Coppeneur of Calgary, Alberta, Canada. Coppeneur Chocolate produces dark and milk couverture without soy lecithin sourced from an organic plantation in Ecuador that grows Nacional Arriba beans. Another example is AMANO ARTISAN CHOCOLATE sold by AMANO CHOCOLATE of Orem, Utah.

The cocoa butter is generally included in the product at from 1-10%, especially from 2-5 wt %, more particularly from 2-3 wt %.

The spread of the invention preferably comprises no more than 0.05 wt % phosphatidyl choline, especially from 0 to 0.05 wt % phosphatidyl choline. For instance, the spread may include from 0.001 wt % to 0.01 wt % phosphatidyl choline.

While the cocoa butter may be added as a component of chocolate, if desired the cocoa butter and/or replacement and/or equivalent and/or substitute may be added as such without other chocolate components such as cocoa solids. Or, if desired, cocoa butter and/or replacement and/or equivalent and/or substitute may be added both in the form of chocolate and as a separate ingredient uncombined with other chocolate components. Cocoa solids can be used at a level of 0.5-10 wt %, preferably from 1-5 wt %, especially from 2-4 wt % of the spread of the invention.

As indicates above, the product of the invention is a nut spread. Preferably the nuts are peanuts but other nuts such as walnuts, cashews, almonds, macadamia nuts, pistachio nuts and mixtures thereof, may be used, as well.

The nut spread may include particulates such as nuts in particulate form so long as the spread remains semisolid.

If needed, dried powdered molasses may be added to improve the color of the final nut spread. A suitable powdered molasses is Dri-Mol Molasses Powder from ADM Specialty Ingredients-Bakery, Decatur, Ill.

The nut spread may optionally be supplemented with one or more of tocopherols at a level of 0.1 to 0.3 wt percent (antioxidant) and peanut flour at a level of 5 to 10 wt percent.

As supplement and to boost further the flavor intensity, a high flavor nut oil, especially peanut oil, may be used in the nut spread of the invention. The high flavor peanut oil is obtained by the extraction of oils from dark roasted peanut. An example of a high flavor peanut oil suitable for use herein is Golden Premium #504505 from Golden Peanut Company of Alpharetta, Ga. The high flavored peanut oil may be added at levels of 0.5 to 3.0 percent of the nut spread.

Apart from the high flavor nut oil, the nut spreads of the invention may include other added oils or fats in addition to the palm oil and cocoa butter stabilizers mentioned above. By added oil/fat is meant oil or fat in addition to that which is expelled from the peanuts or other nuts during grinding but included in the spread, and in addition to the stabilizers (palm based stabilizer and cocoa butter and/or equivalent and/or substitute and/or extender and/or replacement).

The source for any fat used in the nut spreads is preferably vegetable fat, such as for example, palm, palm kernel, soybean, safflower, cottonseed, coconut, rapeseed, canola, corn, peanut, flaxseed and sunflower oils, or mixtures thereof. However, animal fats such as butter fat may also be used if consistent with the desired nutritional profile of the product. Marine oils such as fish oil may also be used, as may other good sources of DHA, EPA and other omega-3 fatty acids. Consistent with the desire for a product which is natural, any oils or fats which are added are preferably not hydrogenated, although hydrogenated oils and fats may be used if consistent with the desired nutritional profile for the product. Preferably the total amount of added fat/oil in the nut spread (including any high flavor peanut oil) is not more than 3 weight percent, especially not more than 5 weight percent, preferably from 1 to 5 weight percent, especially from 1 to 3 wt %. It is preferred that the fats/oils employed in the spread are low trans, especially no-trans. For instance, it is preferred that the percentage by weight of fatty acid moieties having one or more trans double bonds is less than 2 percent of the weight of the spread, especially less then 1.5 wt percent. Addition of triglycerides such as vegetable oils to the ground nuts is optional.

Flavorings may be added to the spread in amounts that will impart a mild, pleasant flavor. Especially useful are peanut flavors. The flavoring may be any of the commercial flavors employed in nut spreads or other foods, such as varying types of cocoa, pure vanilla or artificial flavor, such as vanillin, ethyl vanillin, chocolate, malt, mint, peanut butter, yogurt powder, extracts, spices, such as cinnamon, nutmeg and ginger, mixtures thereof, and the like. It will be appreciated that many flavor variations may be obtained by combinations of the basic flavors. The nut spreads are flavored to taste. Suitable flavorants may also include seasoning, such as salt, and imitation fruit or chocolate flavors either singly or in any suitable combination. Flavors are present in a range of from 0.5 to 3 wt percent, particularly from 0.1 to 3 wt %, especially from 0.1 to 1.5 wt %.

Consistent with the desire that the product not include or at least minimize "unnatural" ingredients, the nut spread will typically not include an emulsifies (other than proteins which may have some emulsifying effect) or will include one that is made naturally (physically extracted with no solvents used in processing) at a very low level of say from 0 to 1 wt %, especially from 0.1 to 0.5 wt %. However, if it is desired to include "normal" emulsifier levels, the nut spread may have an emulsifier at a level of from 0.1 to 3 percent especially from 1 to 2 percent. If included, typical emulsifying agents may be phospholipids and proteins or esters of long chain fatty acids and a polyhydric alcohol. Lecithin is an example. Fatty acid esters of glycerol, polyglycerol esters of fatty acids, sorbitan esters of fatty acids and polyoxyethylene and polyoxypropylene esters of fatty acids and mixtures thereof may be used but organoleptic properties, or course, must be considered. Mono- and di-glycerides are preferred if non-protein emulsifiers are to be included. Emulsifiers may be used in combination, as appropriate.

Typically, the nut spread will be naturally sweetened. Sweetener will generally be included at a level of 2wt percent to 20 wt percent of sweetener solids. Natural sources of sweetness include sucrose (liquid or solids), glucose, fructose, and corn syrup (liquid or solids), including high fructose corn syrup and high maltose corn syrup and mixtures thereof. Other sweeteners include lactose, maltose, glycerine, brown sugar and galactose and mixtures thereof.

If it is desired to use artificial sweeteners, any of the artificial sweeteners well known in the art may be used, such as aspartame, saccharine, Alitame (obtainable from Pfizer), acesulfame K (obtainable from Nutrinova), cyclamates, neotame, sucralose (obtainable from Tate & Lyle), mixtures thereof and the like. Other natural sweeteners like stevia (Rebaudioside A) may also be used. The artificial sweeteners are used, if at all in varying amounts of about 0.001 to 0.3 wt percent of the nut spread.

The mixture of peanuts, seasonings and stabilizers may be ground into a fine paste via the use of milling equipment which is standard in the peanut butter industry, such as a Bauer and/or an Urshel mill. The milled peanut butter paste may be collected in a standard feed or supply tank fitted with a vacuum system to de-aerate the milled paste from any entrapped or entrained atmospheric air. It may also be de-aerated prior to milling.

Example 1

A peanut butter spread with chocolate having the following formula is made by the process set forth below.

Formulation

| 2.85% palm oil stabilizer: 18.5% chocolate | |
|---|---|
| Ingredients | % in Product |
| Peanut Slurry | 67.0856 |
| Fractionated palm oil (IV 14) Revel A from Loders Croklaan | 2.8500 |
| Salt Fine Purified | 0.8894 |
| Sucrose | 10.6750 |
| Semi Sweet Dark Chocolate | 18.5000 |
| TOTAL | 100.0000 |

The chocolate contains 13.5 wt % cocoa butter. The product contains 2.85 wt % fractionated palm oil stabilizer and 2.50 wt % cocoa butter. The IV value for the cocoa butter is 32-42. Overall, the product contains 18.50% semi sweet dark chocolate and 81.50 wt % peanut butter. The product may include approximately 3.5% cocoa solids. If desired, more palm stabilizer may be included, e.g. 3.2% or higher.

Process

Roast, blanch and sort and grind peanuts to make the right quality of peanut slurry 1. Blend Ground Roast Nuts (GRN) in the Slurry Trough while heating in order to achieve a uniform suspension. Fix the preferred flow rate for each ingredient as per formulation.
2. Heat GRN and continuously mix while adding melted stabilizers, salt, sugar, and any added peanut oil. Peanut oil is typically not required but may be added as needed particularly where the fat content of the peanut butter is low. Mix in mix kettle.
3. Once thoroughly mixed, cool product before metering into Urschel Mill.
4. Pass peanut butter base product through mill,
5. Feed into Mixer.
6. In the case where melted chocolate is used, heat the chocolate chips separately in a steam jacketed mixing kettle such that the chips are completely melted to liquid form.
7. Calibrate the pump that meters in the chocolate into peanut butter base to achieve the desired flow rate as per the required weight ratio of cocoa butter stabilizer:palm oil stabilizer (added to the peanut butter base product).
8. There are potentially two stages at which the chocolate can be added to the base peanut butter product (step 8a—chocolate (chips or melted chocolate) added prior to cooling product in votator; 8b —(chocolate added to base peanut butter product post cooling peanut butter in the votator.
    8a. Feed the melted chocolate or solid chocolate chips/powder into the peanut butter base product in the mixer at the desired %. Ensure uniform mixing of chocolate and peanut butter product in the mixer. Transfer product to vacuum kettle.
9. Impose a vacuum on Vacuum Kettle while heating product via steam jacket.
10. Establish the desired final cooling temperatures (84° F. to 87° F. is most preferred in votator.)
11. Pass product through votator to cool to preferred temperature.

8b. Feed the melted chocolate and/or solid chocolate chips and/or chocolate powder at preferred % of chocolate to the peanut butter product that discharges from the votator (at discharge temperature of 84-95° F.) Mix the two streams gently via an inline mixer such that a uniformly mixed chocolate peanut butter product is achieved. In case melted peanut butter is used the temperature of peanut butter base can be 84-87° F. In the scenario where the chocolate chips are used, the discharge temperature of the votator should preferably be above 90° F. such that the inherent temperature of the peanut butter product can be utilized to melt and uniformly mix the chocolate chips/chocolate powder with minimum shear. Once the inline mixing ensures a uniformly mixed product, the cooling of product should be with minimum shear and preferably final cooling completed in the jar.

12. Fill the chocolate peanut butter product in jars.

It is expected that the liquid oils will not separate from the chocolate peanut butter products during 12 months of storage. The nut spread according to the invention can be expected to have a superior spreadability and mouthfeel with better melt in the mouth (by virtue of the sharp melting profile of the added cocoa butter/CB replacers or substitutes) than regular peanut butter products.

It should be understood of course that the specific forms of the invention herein illustrated and described are intended to be representative only, as certain changes may be made therein without departing from the clear teaching of the disclosure. Accordingly, reference should be made to the appended claims in determining the full scope of the invention.

What is claimed is:

1. A nut spread comprising:
   a) Nuts;
   b) Cocoa butter and/or a cocoa butter replacement and/or a cocoa butter equivalent and/or cocoa butter substitute and/or cocoa butter extender, all non-hydrogenated; and
   c) a non-hydrogenated, palm oil fraction stabilizer comprising at least 50%, based on the weight of the palm oil based stabilizer, of a fat having an SFC of at least 94% at 10° C. and at least 85% at 35° C. and a melting point of 140° to 160° F.

2. The nut spread according to claim 1 wherein the nuts comprise peanuts.

3. The nut spread according to claim 1 wherein the spread comprises chocolate as the sole source of the cocoa butter and/or a cocoa butter replacement and/or a cocoa butter equivalent and/or cocoa butter substitute.

4. The nut spread according to claim 1 wherein the palm oil fraction stabilizer has an iodine value of 20 or less.

5. The nut spread according to claim 1 wherein the palm oil fraction stabilizer has an iodine value of 16 or less.

6. The nut spread according to claim 1 wherein the palm oil fraction stabilizer has an iodine value of 14 or less.

7. The nut spread according to claim 1 further comprising cocoa solids.

8. The nut spread according to claim 1 having a wt ratio of palm oil to cocoa butter and/or a cocoa butter replacement and/or a cocoa butter equivalent and/or a cocoa butter substitute of 9:1-1:9.

9. The nut spread according to claim 8 having a wt ratio of palm oil to cocoa butter of and/or a cocoa butter replacement and/or a cocoa butter equivalent and/or cocoa butter substitute of 4:1-1:4, more preferably 2:1 to 1:2.

10. The nut spread according to claim 1 cooled at 83° to 88° F.

11. The nut spread according to claim 1 having no separation of oil after 1 month of storage at 95° F.

12. The nut spread according to claim 1 wherein the cocoa butter and/or a cocoa butter replacement and/or a cocoa butter equivalent and/or cocoa butter substitute and/or cocoa butter extender has an iodine value of from 29 to 40 and a melting point of 88° to 97° F.

13. The nut spread according to claim 1 wherein the spread comprises chocolate as a source of the cocoa butter.

14. The nut spread according to claim 1 further comprising a sweetener.

15. The nut spread according to claim 14 wherein the sweetener comprises sucrose.

16. The nut spread according to claim 15 having no separation of oil after 1 week of storage at 95° F.

17. The nut spread according to claim 1 including 2-4 wt % cocoa solids.

18. A stabilizer composition comprising a palm oil fraction having an IV of 20 or less and melting point of 140° to 160° F. and a cocoa butter or equivalent or replacer having an IV of from 29 to 42 and melting point of 88° to 97° F., at a weight ratio of 9:1-1:9.

19. A nut spread comprising:
   a) Nuts;
   b) Cocoa butter and/or a cocoa butter replacement and/or a cocoa butter equivalent and/or cocoa butter substitute and/or cocoa butter extender, all non-hydrogenated;
   c) a non-hydrogenated, palm oil fraction stabilizer; and
   d) wherein the palm oil fraction has an IV of 20 or less and a melting point of 140° to 160° F. and the cocoa butter and/or a cocoa butter replacement and/or a cocoa butter equivalent and/or cocoa butter substitute and/or cocoa butter extender has an IV of from 29 to 42 and a melting point of 88° to 97° F., at a weight ratio of 9:1-1:9.

20. The nut spread according to claim 19 further comprising 5-20 wt % of a sweetener.

21. The nut spread according to claim 19 having no separation of oil after 1 week of storage at 95° F.

* * * * *